US012797824B2

(12) United States Patent
Lee et al.

(10) Patent No.: US 12,797,824 B2
(45) Date of Patent: Nov. 17, 2026

(54) SUPERABSORBENT POLYMER COMPOSITION AND METHOD FOR PREPARING THE SAME

(71) Applicant: LG Chem, Ltd., Seoul (KR)

(72) Inventors: Seul Ah Lee, Daejeon (KR); Ki Hyun Kim, Daejeon (KR); Gicheul Kim, Daejeon (KR); Tae Yun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 863 days.

(21) Appl. No.: 17/286,989

(22) PCT Filed: Jul. 21, 2020

(86) PCT No.: PCT/KR2020/009615

§ 371 (c)(1),
(2) Date: Apr. 20, 2021

(87) PCT Pub. No.: WO2021/066305

PCT Pub. Date: Apr. 8, 2021

(65) Prior Publication Data

US 2021/0387162 A1 Dec. 16, 2021

(30) Foreign Application Priority Data

Sep. 30, 2019 (KR) ........................ 10-2019-0120645
Jul. 14, 2020 (KR) ........................ 10-2020-0087106

(51) Int. Cl.

*B01J 20/26* (2006.01)
*B01J 20/28* (2006.01)
*B01J 20/30* (2006.01)
*B01J 20/32* (2006.01)

(52) U.S. Cl.

CPC ....... *B01J 20/267* (2013.01); *B01J 20/28011* (2013.01); *B01J 20/28016* (2013.01); *B01J 20/3021* (2013.01); *B01J 20/3085* (2013.01); *B01J 20/3282* (2013.01); *B01J 2220/68* (2013.01)

(58) Field of Classification Search

CPC ................ B01J 20/267; B01J 20/28011; B01J 20/28016; B01J 20/3021; B01J 20/3085; B01J 20/3282; B01J 2220/68; C08J 2333/02; C08J 3/075; C08J 3/12; C08J 3/24; C08J 3/245; C08K 5/09; C08K 5/098; C08K 2201/014; C08F 220/06; C08F 2/48; A61L 15/24; A61L 15/42; A61L 15/60

See application file for complete search history.

(56) References Cited

U.S. PATENT DOCUMENTS

| | | | |
|---|---|---|---|
| 4,883,478 | A | 11/1989 | Lerailler et al. |
| 5,652,309 | A | 7/1997 | Itoh et al. |
| 2005/0118423 | A1 | 6/2005 | Adachi et al. |
| 2009/0312183 | A1 | 12/2009 | Fujimaru et al. |
| 2010/0322876 | A1 | 12/2010 | Nguyen et al. |
| 2011/0301560 | A1 | 12/2011 | Fujimura et al. |

FOREIGN PATENT DOCUMENTS

| | | | | |
|---|---|---|---|---|
| CN | 1697859 | A | | 11/2005 |
| CN | 104788871 | A | | 7/2015 |
| EP | 1659144 | A1 | | 5/2006 |
| JP | 2005097569 | A | | 4/2005 |
| JP | 2007077393 | A | | 3/2007 |
| JP | 2010502768 | A | | 1/2010 |
| JP | 2010185029 | A | | 8/2010 |
| JP | 2018203997 | A | * | 12/2018 |
| KR | 920000785 | B1 | | 1/1992 |
| KR | 20110114535 | A | * | 12/2009 |
| KR | 20190069101 | A | | 6/2019 |
| KR | 20190069103 | A | | 6/2019 |
| WO | 1987003208 | A1 | | 6/1987 |
| WO | 2010073658 | A1 | | 7/2010 |

OTHER PUBLICATIONS

Machine translation of KR20110114535A (Year: 2009).*
Machine translation of JP-2018203997-A (Year: 2018).*
Kao (AKYPO Personal Care) (Year: 2016).*
Search Report for European Application No. 20864255.3 dated Dec. 14, 2021. 2 pgs.
International Search Report for Application No. PCT/KR2020/009615 dated Nov. 6, 2020, pp. 1-3.
Odian, George, Principle of Polymerization, Oct. 1981, p. 203 , John Wiley & Sons, Inc.
Schwalm, Reinhold, UV Coatings Basics, Recent Developments and New Applications, Dec. 2006, p. 115, Elsevier Science.
Search Report dated Mar. 16, 2022 from Office Action for Chinese Application No. 202080005402.4. issued Mar. 24, 2022. 3 pgs.

* cited by examiner

*Primary Examiner* — Anthony J Zimmer
*Assistant Examiner* — Logan Laclair
(74) *Attorney, Agent, or Firm* — Lerner David LLP

(57) ABSTRACT

The present disclosure relates to a superabsorbent polymer composition and a method for preparing the superabsorbent polymer composition. More specifically, according to a superabsorbent polymer composition and a method for preparing the same of the present disclosure, a superabsorbent polymer composition having improved anticaking efficiency without deterioration of absorption performance can be provided.

4 Claims, No Drawings

SUPERABSORBENT POLYMER COMPOSITION AND METHOD FOR PREPARING THE SAME

CROSS-REFERENCE TO RELATED APPLICATIONS

The present application is a national phase entry under 35 U.S.C. § 371 of International Application No. PCT/KR2020/009615, filed on Jul. 21, 2020, which claims priority to Korean Patent Application No. 10-2019-0120645, filed on Sep. 30, 2019, and Korean Patent Application No. 10-2020-0087106, filed on Jul. 14, 2020, the disclosures of which are herein incorporated by reference in their entirety.

TECHNICAL FIELD

The present disclosure relates to a superabsorbent polymer composition and a method for preparing the same. More specifically, the present disclosure relates to a superabsorbent polymer composition having improved anticaking efficiency without deterioration of absorption performance, and a method for preparing the same.

BACKGROUND ART

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as water-holding material for soil, water stop material for civil engineering and architecture, sheets for raising seedling, freshness preservatives in the field of food circulation, fomentation material, etc.

Such superabsorbent polymer is being widely used in the field of hygienic goods such as a diaper or sanitary pad, etc. In the hygienic goods, the superabsorbent polymer is commonly included while being spread in pulp. However, recently, there are continued efforts to provide hygienic goods such as diapers having thinner thickness, and as part of that, development of diapers having decreased pulp content, or pulpless diapers in which pulp is not used at all is actively being progressed.

As such, in hygienic goods having decreased pulp content, or pulpless hygienic goods, superabsorbent polymer is included at relatively high proportion, and thus, superabsorbent polymer particles are inevitably included in multilayers in the hygienic goods. The superabsorbent polymer should exhibit high absorption performance so that the whole superabsorbent polymer particles included in multilayers may absorb large quantities of liquid such as urine, and the like more efficiently.

Meanwhile, the superabsorbent polymer comprises many hydrophilic parts on the surface so as to exhibit high absorption to liquid, specifically water, and due to such hydrophilic parts, it absorbs moisture included in the air when exposed to the air, and thus, aggregation and caking between superabsorbent polymer particles have been generated.

Thus, in order to prevent aggregation and caking between superabsorbent polymer particles, it has been considered to add an anti-caking agent, but when using the anti-caking agent, the absorption performance of superabsorbent polymer was deteriorated.

Thus, there is a continued demand for the development of superabsorbent polymer technology capable of preventing caking between superabsorbent polymer particles, without deterioration of absorption performance.

DISCLOSURE

Technical Problem

It is an object of the present disclosure to provide a superabsorbent polymer composition having improved anticaking efficiency without deterioration of absorption performance, by simultaneously comprising first hydrophobic material and second hydrophobic material of specific structures.

It is another object of the present disclosure to provide a method for preparing a superabsorbent polymer composition, in which hydrogel polymer is prepared and then milled together with a hydrophobic composition, thereby giving hydrophobicity on at least a part of the surfaces of prepared superabsorbent polymer particles, thus preventing caking, and two kinds of hydrophobic materials having different hydrophobic properties are included in the hydrophobic composition, thereby preventing deterioration of absorption performance.

Technical Solution

In order to achieve the object, there is provided a superabsorbent polymer composition comprising superabsorbent polymer particles comprising crosslinked polymer of water soluble ethylenically unsaturated monomers having acid groups, of which at least a part are neutralized;

first hydrophobic material; and second hydrophobic material.

wherein the first hydrophobic material comprises carboxylic acid represented by the following Chemical Formula 1 or a salt thereof, and the second hydrophobic material comprises carboxylic acid represented by the following Chemical Formula 2 or a salt thereof:

[Chemical Formula 1]

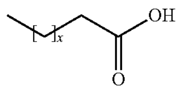

in the Chemical Formula 1, x is an integer of 10 to 20,

[Chemical Formula 2]

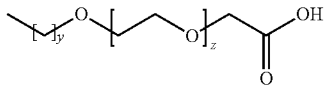

in the Chemical Formula 2, y is an integer of 5 to 15, and z is an integer of 1 to 10.

Also, there is provided a method for preparing a superabsorbent polymer composition comprising the steps of:

conducting crosslinking polymerization of water soluble ethylenically unsaturated monomers having acid groups of which at least a part are neutralized, in the presence of an internal crosslinking agent and a polymerization initiator, to form hydrogel polymer;

introducing a hydrophobic composition comprising the first hydrophobic material and the second hydrophobic material into the hydrogel polymer and milling, to prepare a milled product comprising wet superabsorbent polymer particles and the hydrophobic composition; and drying the milled product to prepare a superabsorbent polymer composition comprising superabsorbent polymer particles, the first hydrophobic material and the second hydrophobic material.

Effect of the Invention

According to the superabsorbent polymer composition of the present disclosure, anticaking efficiency may be improved without deterioration of absorption performance.

And, according to the preparation method of superabsorbent polymer of the present disclosure, when hydrogel polymer is milled while a hydrophobic composition comprising two kinds of hydrophobic materials having different hydrophobic properties are introduced, caking between the prepared superabsorbent polymer particles does not occur, and thus, caking may be prevented even under high temperature and humidity environment.

DETAILED DESCRIPTION OF THE EMBODIMENTS

The terms used herein are only to explain specific embodiments, and are not intended to limit the present disclosure. A singular expression includes a plural expression thereof, unless it is expressly stated or obvious from the context that such is not intended. As used herein, the terms “comprise” or “have”, etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present disclosure and the present disclosure may have various forms, specific examples will be illustrated and explained in detail below. However, it should be understood that these are not intended to limit the present disclosure to specific disclosure, and that the present disclosure includes all the modifications, equivalents or replacements thereof without departing from the spirit and technical scope of the present disclosure.

Hereinafter, a method for preparing superabsorbent polymer and superabsorbent polymer according to specific embodiments of the present disclosure will be explained in detail.

First, technical terms in the present specification are only for mentioning specific embodiments, and they are not intended to restrict the present disclosure unless there is a particular mention about them. And, the singular expressions used herein may include the plural expressions unless it is expressly stated or obvious from the context that such is not intended.

According to one embodiment of the invention, there is provided a superabsorbent polymer composition comprising superabsorbent polymer particles comprising crosslinked polymer of water soluble ethylenically unsaturated monomers having acid groups, of which at least a part are neutralized; first hydrophobic material; and second hydrophobic material.

Wherein the first hydrophobic material comprises carboxylic acid represented by the following Chemical Formula 1 or a salt thereof, and the second hydrophobic material comprises carboxylic acid represented by the following Chemical Formula 2 or a salt thereof:

[Chemical Formula 1]

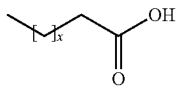

in the Chemical Formula 1, x is an integer of 10 to 20,

[Chemical Formula 2]

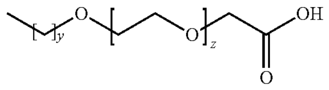

in the Chemical Formula 2, y is an integer of 5 to 15, and z is an integer of 1 to 10.

According to another embodiment of the invention, there is provided a method for preparing a superabsorbent polymer composition comprising the steps of: conducting crosslinking polymerization of water soluble ethylenically unsaturated monomers having acid groups of which at least a part are neutralized, in the presence of an internal crosslinking agent and a polymerization initiator, to form hydrogel polymer; introducing a hydrophobic composition comprising the first hydrophobic material and the second hydrophobic material into the hydrogel polymer and milling, to prepare a milled product comprising wet superabsorbent polymer particles and the hydrophobic composition; and drying the milled product to prepare a superabsorbent polymer composition comprising superabsorbent polymer particles, the first hydrophobic material and the second hydrophobic material.

As used herein, the term “polymer” means a polymerized state of water soluble ethylenically unsaturated monomers, and may include polymers of any moisture content ranges or particle diameter ranges. Among the polymers, polymers having moisture content of about 30 wt % or more before drying may be referred to as hydrogel polymer, and milled and dried particles of such hydrogel polymer may be referred to as crosslinked polymer.

And, the term “superabsorbent polymer particles” refer to particulate matter comprising crosslinked polymer that is polymerized from water soluble ethylenically unsaturated monomers comprising acid groups, of which at least a part are neutralized, and is crosslinked by an internal crosslinking agent.

And, the term “superabsorbent polymer particles” means crosslinked polymer of water soluble ethylenically unsaturated monomers comprising acid groups, of which at least a part are neutralized, or base polymer in the form of powder consisting of superabsorbent polymer particles formed by milling of the crosslinked polymer, according to the context, or it is used to include the crosslinked polymer or base polymer made to be appropriate for the productization through additional processes, for example, surface crosslinking, fine particle reassembly, drying, milling, sieving, and the like. Thus, the term "superabsorbent polymer" may be interpreted as including a composition comprising superabsorbent polymer, namely plural superabsorbent polymer particles.

In general, superabsorbent polymer, which is a crosslinked polymer prepared by the polymerization of water soluble ethylenically unsaturated monomers in the presence of an internal crosslinking agent, has a hydrophilic surface due to remaining acid groups (—COOH) and/or neutralized acid groups (—COO—) that are not polymerized. Due to the hydrophilicity of the surface, superabsorbent polymer absorbs moisture in the air during exposure to the air, and thus, capillary force, hydrogen bond, inter-particular diffusion or van der Waals force between particles, and the like are generated by water existing between the superabsorbent polymer particles, and irreversible aggregation between particles are generated. And, water is necessarily used during the preparation process of superabsorbent polymer, but due to the aggregation between particles during the process, additional milling process is required.

Thus, it was confirmed by the inventors that in case after preparing hydrogel polymer, two kinds of hydrophobic materials having different hydrophobic properties are added and milled together, hydrophobicity may be given to a part of the surfaces of the prepared superabsorbent polymer particles, thereby preventing caking, and due to the hydrophobic materials exhibiting different hydrophobic properties, deterioration of absorption performance may be prevented, and the present disclosure has been completed.

Specifically, both the first hydrophobic material represented by the Chemical Formula 1 and the second hydrophobic material represented by the Chemical Formula 2 simultaneously have a hydrophobic functional group by a linear alkyl group and a hydrophilic functional group by a carboxylic group. Thus, in case they are milled together with hydrogel polymer, the hydrophilic functional groups of the hydrophobic materials are adsorbed to the hydrophilic parts existing on the surfaces of superabsorbent polymer particles, and the surfaces of the particles to which the hydrophobic materials are adsorbed exhibit hydrophobicities due to the linear alkyl groups of the hydrophobic materials. Thus, even if superabsorbent polymer is exposed to the air, a part of the superabsorbent polymer particles exhibit hydrophobicities, and thus, irreversible aggregation between particles may be inhibited.

And, unlike the first hydrophobic material, the second hydrophobic material further comprises one or more ethyleneoxide linking groups between the linear alkyl group and carboxyl group existing at both ends, thus exhibiting lower hydrophobicity than the first hydrophobic material. Thus, in case the first hydrophobic material and the second hydrophobic material are used together during the preparation of superabsorbent polymer, superabsorbent polymer having improved anticaking efficiency without deterioration of absorption performance can be prepared. To the contrary, if the first hydrophobic material is used alone, absorption performance may be deteriorated due to strong hydrophobicity, and if the second hydrophobic material is used alone, anticaking may not be effectively achieved.

Superabsorbent Polymer Composition

Hereinafter, the superabsorbent polymer composition of one embodiment will be explained in detail according to the components.

The superabsorbent polymer composition of one embodiment comprises superabsorbent polymer particles comprising crosslinked polymer of water soluble ethylenically unsaturated monomers having acid groups of which at least a part are neutralized. Wherein, the crosslinked polymer is formed by crosslinking polymerization of water soluble ethylenically unsaturated monomers having acid groups of which at least a part are neutralized, in the presence of an internal crosslinking agent, and has a three-dimensional network structure in which the main chains formed by polymerization of the monomers are crosslinked by the internal crosslinking agent.

The water soluble ethylenically unsaturated monomers may be any monomers commonly used in the preparation of superabsorbent polymer. As non-limiting examples, the water soluble ethylenically unsaturated monomer may be a compound represented by the following Chemical Formula 3:

R1-COOM2 [Chemical Formula 3]

in the Chemical Formula 3,

R1 is a C2-5 alkyl group comprising an unsaturated bond,

M2 is a hydrogen atom, a monovalent or divalent metal, an ammonium group or an organic amine salt.

Preferably, the monomers may be one or more selected from the group consisting of (meth)acrylic acid, and monovalent (alkali) metal salts, divalent metal salts, ammonium salts and organic amine salts thereof.

It is favorable that (meth)acrylic acid or a salt thereof is used as the water soluble ethylenically unsaturated monomer, because superabsorbent polymer with improved absorption property can be obtained. In addition, as the monomers, one or more selected from the group consisting of maleic anhydride, fumaric acid, crotonic acid, itaconic acid, 2-acryloylethane sulfonic acid, 2-methacryloylethane sulfonic acid, 2-(meth)acryloylpropane sulfonic acid, 2-(meth)acrylamide-2-methylpropane sulfonic acid, (meth)acrylamide, N-substituted (meth)acrylate, 2-hydroxyethyl (meth)acrylate, 2-hydroxypropyl (meth)acrylate, methoxy polyethylene glycol (meth)acrylate, polyethylene glycol (meth)acrylate, (N,N)-dimethylaminoethyl (meth)acrylate or (N,N)-dimethylaminopropyl (meth)acrylamide, and the like may be used.

Wherein, the water soluble ethylenically unsaturated monomers may have acid groups, and at least a part of the acid groups may be neutralized. Specifically, in the step of mixing the water soluble ethylenically unsaturated monomers having acid groups, the internal crosslinking agent, the polymerization initiator and a neutralizing agent, at least a part of the acid groups of the water soluble ethylenically unsaturated monomers may be neutralized. Wherein, as the neutralizing agent, basic materials such as sodium hydroxide, potassium hydroxide, ammonium hydroxide, and the like, capable of neutralizing the acid groups may be used.

And, the neutralization degree of water soluble ethylenically unsaturated monomers, which refers to the degree of neutralization of the acid groups included in the water soluble ethylenically unsaturated monomers by the neutralizing agent, may be 50 to 90 mol %, or 60 to 85 mol %, or 65 to 85 mol %, or 65 to 75 mol %. Although the range of the neutralization degree may vary according to the final properties, if the neutralization degree is too high, neutralized monomers may be precipitated, thus rendering smooth progression of polymerization difficult, and to the contrary, if the neutralization degree is too low, the absorption of the polymer may be significantly lowered, and the polymer may exhibit rubber-like property, which is difficult to handle.

And, the term "internal crosslinking agent" is used herein to distinguish from a surface crosslinking agent for surface crosslinking of superabsorbent polymer particles as described below, and functions for crosslinking the unsaturated bonds of the above explained water soluble ethylenically unsaturated monomers to polymerize. In this step, crosslinking is progressed without distinction of the surface and inside, but in case a surface crosslinking process of superabsorbent polymer particles as described below is progressed, the surfaces of the finally prepared superabsorbent polymer particles consist of a structure crosslinked by the surface crosslinking agent, and the inside consists of a structure crosslinked by the internal crosslinking agent.

As the internal crosslinking agent, any compounds may be used as long as it enables the introduction of crosslink during the polymerization of the water soluble ethylenically unsaturated monomers. As non-limiting examples, as the internal crosslinking agent, multifunctional crosslinking agents such as N,N'-methylenebisacrylamide, trimethylolpropane tri(meth)acrylate, ethyleneglycol di(meth)acrylate, polyethyleneglycol(meth)acrylate, propyleneglycol di(meth)acrylate, polypropyleneglycol(meth)acrylate, butanedioldi(meth)acrylate, butyleneglycoldi(meth)acrylate, diethyleneglycol di(meth)acrylate, hexanedioldi(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propylene glycol, glycerin, or ethylenecarbonate may be used alone or in combinations, but it is not limited thereto. Preferably, among them, ethyleneglycol diglycidyl ether may be used.

The crosslinking of the water soluble ethylenically unsaturated monomers in the presence of such an internal crosslinking agent may be conducted by thermal polymerization, photopolymerization or hybrid polymerization, in the presence of a thickener, a plasticizer, a preservation stabilizer, an antioxidant, and the like, as necessary, which will be explained in detail later.

Such superabsorbent polymer particles may have particle diameters of about 150 to about 850 μm, and the particle diameter may be measured according to EDANA (European Disposables and Nonwovens Association) standard of EDANA WSP 220.3.

And, the superabsorbent polymer composition comprises the first hydrophobic material represented by the Chemical Formula 1 and the second hydrophobic material represented by the Chemical Formula 2, besides the superabsorbent polymer particles. The first hydrophobic material and the second hydrophobic material may be mixed during the milling process of hydrogel polymer after polymerization, instead of during the polymerization process, and uniformly covered on the surfaces of the superabsorbent polymer particles, as explained above.

The first hydrophobic material comprises carboxylic acid represented by the following Chemical Formula 1 or a salt thereof. And, the first hydrophobic material may be carboxylic acid represented by the following Chemical Formula 1 or a salt thereof.

In the Chemical Formula 1, a part exhibiting hydrophobicity is a linear alkyl group having carbon number of x+2, wherein if x is less than 10, sufficient hydrophobicity may not be given to the surfaces of superabsorbent polymer particles, and if x is greater than 20, the molecular length of the material may be too lengthen, and may not be effectively covered on hydrogel polymer. More specifically, x may be 11 or more, 13 or more, or 14 or more, and 18 or less, 17 or less, or 16 or less. For example, x may be an integer of 11 to 15.

And, the first hydrophobic material comprises, besides carboxylic acid represented by the Chemical Formula 1, salts thereof, wherein specifically, the carboxylic acid salt may be a monovalent metal salt, a divalent metal salt, or an ammonium salt. More specifically, the carboxylic acid salt may be an alkali metal salt such as a sodium salt or a potassium salt.

As the first hydrophobic material, stearic acid, myristic acid, palmitic acid, or alkali metal salts thereof may be used.

Meanwhile, in the Chemical Formula 2, a part exhibiting hydrophobicity is a linear alkyl group having a carbon number of y+1, wherein if y is less than 5, sufficient hydrophobicity may not be given to the surfaces of superabsorbent polymer particles, as in the first hydrophobic material, and if y is greater than 15, the molecular length of the material may be too lengthen, and may not be effectively covered on hydrogel polymer. More specifically, y may be 9 or more, 10 or more, and 13 or less, 12 or less. For example, y may be 11.

And, if z meaning the number of ethyleneoxide linking groups of the Chemical Formula 2 is 0, the hydrophobic properties may not differ from the first hydrophobic material, and thus, the absorption speed of superabsorbent polymer may be deteriorated, and if z is greater than 10, it may be difficult to give hydrophobic property to superabsorbent polymer, and thus, it may be difficult to inhibit caking between particles. More specifically, z may be 2 or more, 3 or more, or 4 or more, and 10 or less. For example, z may be an integer of 5 to 10.

Wherein, the second hydrophobic material comprises, besides carboxylic acid represented by the Chemical Formula 2, a salt thereof, and for the explanations about the salts, explanations about the first hydrophobic material may be referred to.

As the second hydrophobic material, laureth-6 carboxylic acid, laureth-7 carboxylic acid, laureth-8 carboxylic acid, laureth-9 carboxylic acid, laureth-10 carboxylic acid, laureth-11 carboxylic acid, or alkali metal salts thereof may be used.

And, the first hydrophobic material may be a solid phase at 25° C. Namely, the melting point of the first hydrophobic material may be higher than 25° C., and thus, it may be in a solid state at room temperature. And, the second hydrophobic material may be a liquid phase at 25° C. Namely, the melting point of the second hydrophobic material may be lower than 25° C., and thus, it may be in a liquid state at room temperature.

Wherein, the total weight of the first hydrophobic material and second hydrophobic material may be 0.01 to 1.0 part by weight, based on 100 parts by weight of the superabsorbent polymer particles. If the total weight of the hydrophobic materials is too low in the composition, the effect of giving hydrophobicity by the hydrophobic materials may be insufficient, and thus, it may be difficult to inhibit caking, and if the total weight of the hydrophobic materials is too high, centrifuge retention capacity and absorbency under pressure of superabsorbent polymer may be deteriorated.

And, the first hydrophobic material and the second hydrophobic material may be included at a mole ratio of 3:7 to 7:3. Based on the total moles of hydrophobic materials, if the mole ratio of the first hydrophobic material is too high, absorption speed of superabsorbent polymer may be deteriorated, and if the mole ratio of the second hydrophobic material is too high, the effect of giving hydrophobicity to superabsorbent polymer may be insufficient, and thus, caking between particles may not be inhibited.

Meanwhile, at least a part of the first hydrophobic material and second hydrophobic material may exist on the surfaces of the superabsorbent polymer particles. Wherein, the description "at least a part of the first hydrophobic material and second hydrophobic material may exist on the surfaces of the superabsorbent polymer particles" means that at least a part of the first hydrophobic material and second hydrophobic material are adsorbed or bonded to the surfaces of the superabsorbent polymer particles. Specifically, the first hydrophobic material and second hydrophobic material may be physically or chemically adsorbed on the surface of the superabsorbent polymer. More specifically, the hydrophilic functional groups of the first hydrophobic material and second hydrophobic material may be physically adsorbed to the hydrophilic parts of the superabsorbent polymer surface by intermolecular force such as dipole-dipole interaction. As such, the hydrophilic parts of the first hydrophobic material and second hydrophobic material may be physically adsorbed to the surfaces of the superabsorbent polymer particles and cover the surfaces, the hydrophobic parts of the first hydrophobic material and second hydrophobic material may not be adsorbed to the surfaces of polymer particles, and thus, in the superabsorbent polymer particles, the parts to which hydrophobic materials are adsorbed may exhibit hydrophobicities.

Thus, in case at least a part of the first hydrophobic material and second hydrophobic material exist on the surfaces of the superabsorbent polymer particles, compared to the case wherein all the hydrophobic materials exist inside of superabsorbent polymer particles, specifically, inside of crosslinked polymer, caking of the superabsorbent polymer particles during exposure to the air may be more effectively inhibited.

Meanwhile, the superabsorbent polymer composition may further comprise a surface crosslink layer formed by additional crosslinking of the crosslinked polymer by a surface crosslinking agent, on at least a part of the surfaces of the superabsorbent polymer particles. It is intended to increase the surface crosslinking density of superabsorbent polymer particles, and in case the superabsorbent polymer particle further comprises a surface crosslink layer, it may have a structure in which the external crosslinking density is higher than the internal crosslinking density.

As the surface crosslinking agent, surface crosslinking agents previously used in the preparation of superabsorbent polymer may be used without specific limitations. For example, the surface crosslinking agent may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; one or more carbonate-based compounds selected from the group consisting of ethylene carbonate, propylene carbonate and glycerol carbonate; epoxy compounds such as ethyleneglycol diglycidyl ether, and the like; oxazoline compounds such as oxazolidinone, and the like; polyamine compounds; mono-, di-, or polyoxazolidinone compounds; or cyclic urea compounds; and the like.

Specifically, as the surface crosslinking agent, one or more, or two or more, or three or more kinds of the above explained surface crosslinking agents may be used, and for example, ethylenecarbonate-propylenecarbonate (ECPC), propyleneglycol and/or glycerol carbonate may be used.

And, based on the total weight of the superabsorbent polymer composition, about 90 wt %, preferably 95 wt % or more of the superabsorbent polymer composition may be superabsorbent polymer particles having particle diameters of about 150 to 850 μm.

And, the superabsorbent polymer composition may have centrifuge retention capacity (CRC) measured according to EDANA method WSP 241.3 of 30 g/g or more, or 31 g/g or more, or 33 g/g or more, and 40 g/g or less, or 38 g/g or less, or 37 g/g or less.

And, the superabsorbent polymer composition may have absorbency under pressure (AUP) of 0.3 psi, measured according to EDANA method WSP 242.3, of 18 g/g or more, or 20 g/g or more or 22 g/g or more, and 27 g/g or less, or 25 g/g or less.

And, the superabsorbent polymer composition may have anti-caking (A/C) efficiency of 20% or more, more specifically 30% or more, 40% or more, or 50%, and the higher the value, more excellent the anti-caking efficiency, and thus, there is not upper limit of the anti-caking efficiency, but for example, it may be 75% or less, 70% or less, or 65% or less. Wherein, the anti-caking efficiency is calculated by the following Mathematical Formula 3:

$$A/C\ (\%)=W_6/W_5\times 100 \qquad \text{[Mathematical Formula 3]}$$

in the Mathematical Formula 3, $W_5$ is the weight (g) of the superabsorbent polymer composition applied on a flask dish having a diameter of 10 cm, and $W_6$ is the weight (g) of the superabsorbent polymer composition falling from a flask dish, after uniformly applying the superabsorbent polymer composition on a flask dish having a diameter of 10 cm, maintaining it in a constant temperature and humidity chamber of temperature of 40±3° C. and humidity of 80±3% for 10 minutes, and then, turning the flask dish upside down on a filter paper and lightly tapping 3 times.

And, the superabsorbent polymer may have a wetting time of 15 seconds or less, more specifically 13 seconds or less, 10 seconds or less, or 5 seconds or less, said wetting time being defined as a total time for which a non-wetted superabsorbent polymer composition is observed at the top of liquid, while putting 2 g of the superabsorbent polymer composition in 50 mL of a saline solution of 23° C. to 24° C., and stirring at 600 rpm with a magnetic bar (diameter 8 mm, length 30 mm), and the lower the value, more excellent the wetting time, and thus, the lower limit of the wetting time is theoretically 0 second, but for example, it may be 1 second or more.

Wherein, the measurement method of the properties of the superabsorbent polymer composition will be explained in detail in the examples below.

Thus, in case two kinds of hydrophobic materials satisfying specific Chemical Formulas are simultaneously used as explained above, a superabsorbent polymer composition having excellent absorption performance and anti-caking efficiency, wherein anti-caking (A/C) efficiency calculated by the Mathematical Formula 3 is 20% or more, and wetting time is 15 seconds or less, can be provided.

A Method for Preparing a Superabsorbent Polymer Composition

Meanwhile, according to another embodiment of the present disclosure, there is provided a method for preparing a superabsorbent polymer composition comprising the steps of: conducting crosslinking polymerization of water soluble ethylenically unsaturated monomers having acid groups of which at least a part are neutralized, in the presence of an internal crosslinking agent and a polymerization initiator, to form hydrogel polymer; introducing a hydrophobic composition comprising first hydrophobic material and second hydrophobic material into the hydrogel polymer and milling, to prepare a milled product comprising wet superabsorbent polymer particles and the hydrophobic composition; and drying the milled product to prepare a superabsorbent polymer composition comprising superabsorbent polymer particles, the first hydrophobic material and the second hydrophobic material.

Hereinafter, the method for preparing a superabsorbent polymer of one embodiment will be explained in detail according to each step.

In the method for preparing superabsorbent polymer according to one embodiment, first, a step of crosslinking polymerization of water soluble ethylenically unsaturated monomers having acid groups of which at least a part are neutralized, in the presence of an internal crosslinking agent and a polymerization initiator, to form hydrogel polymer, is conducted.

This step may comprise the steps of mixing the water soluble ethylenically unsaturated monomers, an internal crosslinking agent and a polymerization initiator to prepare a monomer composition, and conducting thermal polymerization or photopolymerization of the monomer composition to form hydrogel polymer. Wherein, for the water soluble ethylenically unsaturated monomers and internal crosslinking agent, the above explanations may be referred to.

In the monomer composition, the internal crosslinking agent may be used in an amount of 0.01 to 5 parts by weight, based on 100 parts by weight of the water soluble ethylenically unsaturated monomers. For example, the internal crosslinking agent may be used in an amount of 0.01 parts by weight or more, 0.05 parts by weight or more, 0.1 parts by weight, or more, or 0.2 parts by weight or more, and 5 parts by weight or less, 3 parts by weight or less, 2 parts by weight or less, 1 part by weight or less, or 0.5 parts by weight or less, based on 100 parts by weight of the water soluble ethylenically unsaturated monomers. If the content of the internal crosslinking agent is too low, crosslinking may not sufficiently occur, and thus, it may be difficult to realize strength beyond an optimum level, and if the content of the internal crosslinking agent is too high, internal crosslinking density may increase, and thus, it may be difficult to realize desired centrifuge retention capacity.

And, the polymerization initiator may be appropriately selected according to polymerization methods, and in case thermal polymerization is used, a thermal polymerization initiator may be used; in case photopolymerization is used, a photopolymerization initiator may be used; and in case hybrid polymerization method (using both heat and light) is used, both a thermal polymerization initiator and a photopolymerization initiator may be used. However, even in the case of photopolymerization, since a certain amount of heat is generated by UV irradiation, etc., and heat is generated to some degree according to the progression of an exothermic polymerization reaction, a thermal polymerization initiator may be additionally included.

As the photopolymerization initiator, any compounds capable of forming radicals by light such as UV may be used without limitations.

As the photopolymerization initiator, one or more selected from the group consisting of benzoin ether, dialkyl acetophenone, hydroxyl alkylketone, phenyl glyoxylate, benzyl dimethyl Ketal, acyl phosphine, and α-aminoketone may be used. Meanwhile, specific examples of acylphosphine may include diphenyl(2,4,6-trimethylbenzoyl)phosphine oxide, phenylbis(2,4,6-trimethylbenzoyl)phosphine oxide, ethyl (2,4,6-trimethylbenzoyl)phenylphosphinate and the like.

More various photopolymerization initiators are described in Reinhold Schwalm, "UV Coatings: Basics, Recent Developments and New Application (Elsevier 2007)", page 115, and are not limited to the above described examples.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate ($(NH_4)_2S_2O_8$), etc., and, specific examples of the azo initiator may include 2,2-azobis (2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl) propane]dihydrochloride, 4,4-azobis-(4-cyanovalericacid), etc. More various thermal initiators are described in "Principle of Polymerization (Wiley, 1981)", Odian, page 203, and are not limited to the above described examples.

Such a polymerization initiator may be added in the content of 2 parts by weight or less, base on 100 parts by weight of the water soluble ethylenically unsaturated monomers. Namely, if the concentration of the polymerization initiator is too low, polymerization speed may become slow, and the remaining monomers may be extracted in a large quantity in the final product. To the contrary, if the concentration of the polymerization initiator is too high, the polymer chain making up a network may be shortened, and thus, water soluble contents may increase and absorbency under pressure may be lowered, thus deteriorating the properties of polymer.

In addition, the monomer composition may further comprise additives such as a thickener, a plasticizer, a preservation stabilizer, an antioxidant, etc., as necessary.

And, the monomer composition comprising monomers may be in a solution state, dissolved in a solvent such as water, and the solid content in the monomer composition of a solution state, namely, the concentrations of monomers, internal crosslinking agent and polymerization initiator may be appropriately controlled considering polymerization time and reaction conditions. For example, the solid content in the monomer composition may be 10 to 80 wt %, or 15 to 80 wt %, or 20 to 60 wt %.

In case the monomer composition has a solid content of the above range, there is no need to remove unreacted monomers after polymerization due to gel effect occurring in the polymerization reaction of a high concentration aqueous solution, and it may be favorable for the control of milling efficiency when milling polymer as described below.

Here, the solvent that can be used is not limited in terms of its construction as long as it can dissolve or disperse the above explained raw materials, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

Meanwhile, the crosslinking polymerization of water soluble ethylenically unsaturated monomers having acid groups of which at least a part are neutralized, may be progressed without specific limitations, as long as it can form hydrogel polymer by thermal polymerization, photopolymerization, or hybrid polymerization.

Specifically, polymerization methods are largely classified into thermal polymerization and photopolymerization according to polymerization energy source, and commonly, the thermal polymerization may be progressed in a reactor having a stirring axis such as kneader, and the photopolymerization may be progressed in a reactor equipped with a movable conveyor belt, or in a flat bottom container, but the above polymerization methods are not more than examples, and the present disclosure is not limited thereto.

For example, hydrogel polymer may be obtained by introducing the above described monomer composition into a reactor equipped with a stirring axis such as a kneader, and supplying hot air or heating the reactor to progress thermal polymerization. Here, the hydrogel polymer discharged to the outlet of the reactor may be obtained in the size of a few centimeters to a few millimeters according to the shape of the stirring axis equipped in the reactor. Specifically, the size of obtained hydrogel polymer may vary according to the concentration of the introduced monomer composition and the introduction speed, etc., and commonly, hydrogel polymer with a (weight average) particle diameter of 2 to 50 mm may be obtained.

And, in case photopolymerization of the monomer composition is progressed in a reactor equipped with a movable conveyer belt as explained above, hydrogel polymer in the form of a sheet having a width of the belt may be obtained. Wherein, the thickness of the sheet may vary according to the concentration of the introduced monomer mixture and the introduction speed or introduction amount, but it is preferable that the monomer composition is supplied so as to obtain polymer in the form of a sheet having a thickness of about 0.5 to about 5 cm. In case the monomer composition is supplied so that the thickness of polymer in the form of a sheet may be too thin, production efficiency may be low, and if the thickness of the polymer in the form of a sheet is greater than 5 cm, due to too thick thickness, the polymerization reaction may not uniformly occur over the whole thickness.

The polymerization time of the monomer composition is not specifically limited, and it may be controlled to about 30 seconds to 60 minutes.

Wherein, the moisture content of the obtained hydrogel polymer may be 30 to 70 wt %. For example, the moisture content of the hydrogel polymer may be 40 wt % or more, or 45 wt % or more, and 70 wt % or less, 65 wt % or less, 60 wt % or less, or 50 wt % or less. The moisture content of the hydrogel polymer should not be less than 30 wt % in terms of progression of polymerization, and if the moisture content of the hydrogel polymer is too high, the hydrophobic composition may penetrate inside of the polymer, and thus, the inhibition of caking between the prepared particles may not be significant.

Here, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer in the state of crumb through infrared heating to dry. Wherein, the drying condition may be set up such that the temperature is raised from room temperature to about 180° C. and then maintained at 180° C., and the total drying time may be 40 minutes including a temperature raising step of 5 minutes.

Next, a hydrophobic composition comprising first hydrophobic material and second hydrophobic material is introduced into the hydrogel polymer, and then, the mixture is milled to prepare a milled product comprising wet superabsorbent polymer particles and the hydrophobic composition. For the details of the first hydrophobic material and second hydrophobic material, the above explanations may be referred to.

In the common preparation method of superabsorbent polymer, hydrogel polymer is coarsely milled without introduction of hydrophobic material, and then, milled to a desired particle size to prepare superabsorbent polymer. In this case, coarsely milled superabsorbent polymer particles may be aggregated or agglomerated by water used during the process, thus increasing internal load to cause device failure. And, a strong force should be applied so as to mill such aggregated superabsorbent polymer to a desired particle size, and thus, the properties of superabsorbent polymer may be deteriorated.

However, as explained above, in case hydrogel polymer is milled together with the first hydrophobic material and second hydrophobic material, particle group having desired particle diameter can be prepared without aggregation of milled particles. Thus, the method for preparing a superabsorbent polymer composition according to one embodiment enables milling to particles having desired particle sizes without applying a strong force, thus largely reducing the production cost of superabsorbent polymer.

In this step, the total weight of the first hydrophobic material and second hydrophobic material may be 0.01 to 1 part by weight, based on 100 parts by weight of the hydrogel polymer. Specifically, the first hydrophobic material and second hydrophobic material may be used in an amount of 0.1 parts by weight or more, or 0.2 parts by weight or more, and 1 part by weight or less, 0.8 parts by weight or less, or 0.5 parts by weight or less, based on 100 parts by weight of the hydrogel polymer. In case the first hydrophobic material and second hydrophobic material are used too less, the hydrophobic materials may not be uniformly applied on the surface of the hydrogel polymer, and thus, the effect of giving hydrophobicity may be insignificant, and if the first hydrophobic material and second hydrophobic material are used too much, the properties of the finally prepared superabsorbent polymer may be deteriorated.

Such first hydrophobic material and second hydrophobic material may be respectively included as raw material, or in the form of a water dispersion, in the hydrophobic composition.

More specifically, the first hydrophobic material and second hydrophobic material may be introduced as raw materials in the hydrogel polymer, wherein in case the first hydrophobic material is solid at room temperature, it may be molten by heat generated during milling after introduction, and thus, adsorbed to the milled polymer particles.

Otherwise, the first hydrophobic material and second hydrophobic material may be introduced while being mixed in water. Namely, the hydrophobic composition may further comprise water, wherein the solid content of the hydrophobic composition may be 0.5 wt % or more and 100 wt % or less. The hydrophobic composition having the above solid content range may be appropriate because it may be uniformly applied on hydrogel polymer.

The hydrophobic composition may be introduced into a reactor where hydrogel polymer has been prepared, and mixed, or may be introduced into a mixer together with hydrogel polymer, and sprayed, or may be introduced by continuously supplying to a continuously operated mixer together with hydrogel polymer.

After introducing the hydrophobic composition in the hydrogel polymer, milling may be conducted such that wet superabsorbent polymer particles may have particle diameters of 300 μm to 5000 μm. Wherein, the "wet superabsorbent polymer particles" mean particles having moisture content of about 40 wt % or more, and since they are formed by milling the hydrogel polymer in the form of particles without separate drying process, they may have moisture content of 30 to 70 wt % like the hydrogel polymer. The particle diameter may be measured according to EDANA (European Disposables and Nonwovens Association, EDANA) standard EDANA WSP 220.3.

Wherein, as a mill used for milling, specifically, a vertical pulverizer, a turbo cutter, a turbo grinder, a rotary cutter mill, a cutter mill, a disc mill, a shred crusher, a crusher, a chopper and a disc cutter may be used, but it is not limited thereto.

However, in terms of process stability, it is preferable that the milling process is conducted using a chopper.

Meanwhile, at least a part of the first hydrophobic material and second hydrophobic material included in the milled product may exist on the surfaces of the wet superabsorbent polymer particles. As explained above, the expression "at least a part of the first hydrophobic material and second hydrophobic material exist on the surfaces of the wet superabsorbent polymer particles" means that at least a part of the first hydrophobic material and second hydrophobic material are adsorbed or bonded to the surfaces of the wet superabsorbent polymer particles. Since hydrophobic materials are introduced after formation of polymer instead of during the polymerization process of the water soluble ethylenically unsaturated monomers, compared to the case wherein the hydrophobic materials are introduced during the polymerization process and hydrophobic material exist inside of polymer, re-caking of wet superabsorbent polymer particles may be inhibited.

Next, the milled product is dried to prepare a superabsorbent polymer composition comprising superabsorbent polymer particles, the first hydrophobic material and the second hydrophobic material.

The drying of the milled product may be conducted such that plural superabsorbent polymer particles included in the prepared superabsorbent polymer composition may respectively have a moisture content of about 10 wt % or less, specifically, about 0.1 to about 10 wt %.

Wherein, the drying temperature may be about 60° C. to about 250° C. If the drying temperature is too low, drying time may be too lengthen, and if the drying temperature is too high, only the surface of the polymer may be dried, and thus, there is a concern about deterioration of the properties of the finally prepared superabsorbent polymer. Thus, preferably, the drying may be progressed at a temperature of about 100° C. to about 240° C., more preferably at a temperature of about 110° C. to about 220° C.

And, the drying time may be about 20 minutes to about 12 hours considering process efficiency, and the like. For example, the drying may be conducted for about 10 minutes to about 100 minutes, or about 20 minutes to about 60 minutes.

The drying method is not specifically limited as long as it is commonly used for a drying process. Specifically, the drying may be conducted by hot wind supply, infrared ray irradiation, ultrahigh frequency wave irradiation, or UV irradiation, etc.

And, after drying the milled product, it may be milled using a mill such that the finally prepared superabsorbent polymer particles may consist of particles of about 150 μm to about 850 μm.

As a mill that can be used, a pin mill, a hammer mill, a screw mill, a roll mill, a disc mill, or a jog mill, etc. may be used, but it is not limited thereto.

Thereafter, as necessary, a step of forming a surface crosslink layer on at least a part of the surfaces of the superabsorbent polymer particles, in the presence of a surface crosslinking agent, may be further included. By this step, the crosslinked polymer included in the superabsorbent polymer particles may be additionally crosslinked by a surface crosslinking agent, thus forming a surface crosslink layer on at least a part of the surfaces of the superabsorbent polymer particles.

Such a surface crosslinking agent may be used in an amount of about 0.001 to about 5 parts by weight, based on 100 parts by weight of the superabsorbent polymer particles. For example, the surface crosslinking agent may be used in an amount of 0.005 parts by weight or more, 0.01 parts by weight or more, or 0.05 parts by weight or more, and 5 parts by weight or less, 4 parts by weight or less, or 3 parts by weight or less, based on 100 parts by weight of the superabsorbent polymer particles. By controlling the content range of the surface crosslinking agent within the above ranges, superabsorbent polymer exhibiting excellent absorption properties can be prepared.

And, in the step of forming a surface crosslink layer, inorganic material may be additionally added to the surface crosslinking agent. Namely, the step of forming a surface crosslinking may be conducted by additionally crosslinking the surfaces of the superabsorbent polymer particles, in the presence of the surface crosslinking agent and inorganic material.

As the inorganic material, one or more inorganic materials selected from the group consisting of silica, clay, alumina, silica-alumina composite, titania, zinc oxide and aluminum sulfate may be used. The inorganic material may be used in the form of power or liquid, and particularly, alumina powder, silica-alumina powder, titania powder, or a nano silica solution may be used. And, the inorganic material may be used in the content of about 0.001 to about 1 part by weight, based on 100 parts by weight of the superabsorbent polymer particles.

And, a method of mixing the surface crosslinking agent with the superabsorbent polymer composition is not limited. For example, the surface crosslinking agent and superabsorbent polymer composition may be put in a reactor and mixed, or the surface crosslinking agent may be sprayed to the superabsorbent polymer composition, or the superabsorbent polymer composition and surface crosslinking agent may be continuously supplied to a continuously operated mixer, and mixed.

When mixing the surface crosslinking agent and superabsorbent polymer composition, water and methanol may be additionally mixed and added. In case water and methanol are added, the surface crosslinking agent may be uniformly dispersed in the superabsorbent polymer composition. Wherein, the contents of added water and methanol may be appropriately controlled so as to induce uniform dispersion of the surface crosslinking agent, prevent agglomeration of the superabsorbent polymer composition, and optimize penetration depth of the crosslinking agent.

The surface crosslinking process may be conducted at a temperature of about 80° C. to about 250° C. More specifically, the surface crosslinking process may be conducted at a temperature of about 100° C. to about 220° C., or about 120° C. to about 200° C., for about 20 minutes to about 2 hours, or about 40 minutes to about 80 minutes. When fulfilling the above explained surface crosslinking conditions, the surfaces of superabsorbent polymer particles may be sufficiently crosslinked, and thus, absorbency under pressure may be increased.

A temperature rise means for the surface crosslinking reaction is not specifically limited. A heating medium may be supplied, or a heat source may be directly supplied to heat. Here, the kinds of the heating medium that can be used may include temperature-increased fluid such as steam, hot air, hot oil, etc., but are not limited thereto, and may be appropriately selected considering the means of the heating medium, temperature rise speed and a temperature to be increased. Meanwhile, the heat source directly supplied may include electric heating, gas heating, etc., but is not limited thereto.

Hereinafter, preferable examples are presented for better understanding of the present disclosure. However, these examples are presented only as the illustrations of the present disclosure, and the present disclosure is not limited thereby.

EXAMPLE—PREPARATION OF SUPERABSORBENT POLYMER COMPOSITION

Example 1

Into a 3 L glass container equipped with a stirrer and a thermometer, 100 g (1.388 mol) of acrylic acid, 0.26 g of internal crosslinking agent polyethyleneglycol diacrylate (PEGDA, Mw=400), 0.008 g of photopolymerization initiator diphenyl(2,4,6-trimethylbenzoyl)phosphine oxide, 0.20 g of thermal polymerization initiator sodium persulfate, and 123.5 g of 32% caustic soda solution were mixed with 40.0 g of water at room temperature to prepare a monomer composition (neutralization degree of acrylic acid: 70 mol %, solid content: 45.0 wt %).

Thereafter, the monomer composition was supplied on a conveyor belt with a width of 10 cm and a length of 2 m rotating at 50 cm/min, at a speed of 500~ 2000 mL/min. And, simultaneously with supplying of the monomer composition, UV was irradiated at the intensity of 10 mW/cm2 to progress a polymerization reaction for 60 seconds, thus obtaining hydrogel polymer having a moisture content of 46.5 wt %.

Next, to the hydrogel polymer, a hydrophobic composition (solvent:water, solid content 2.91 wt %) comprising stearic acid (represented by the following Chemical Formula 1-1, manufactured by LG Household & Health Care) and laureth-6 carboxylic acid (represented by the following Chemical Formula 2-1, manufactured by KAO) at a mole ratio of 7:3 was introduced such that the total weight became 0.3 parts by weight, based on 100 parts by weight of the hydrogel polymer, and then, milled using a meat chopper such that the hydrogel polymer became particles having particle diameters of 300 μm to 5000 μm. Wherein, the moisture content of the wet superabsorbent polymer particles included in the milled product was 46 wt %.

Thereafter, the milled product was dried in hot air of 185° C. for 30 minutes using an air-flow oven.

To 100 g of the dried product, a solution mixture of 3.2 g of ultrapure water, 4.5 g of methanol, and 0.13 g of ethylene carbonate was introduced, and mixed using a magnetic stirrer for 1 minute, and then, a surface crosslinking reaction was progressed at 198° C. for 60 minutes using a convection oven. And, then, it was sieved to prepare a superabsorbent polymer composition comprising superabsorbent polymer particles of 150 to 850 μm.

[Chemical Formula 1-1]

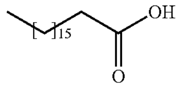

[Chemical Formula 2-1]

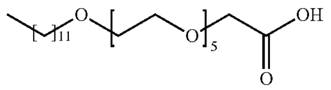

Example 2

A superabsorbent polymer composition was prepared by the same method as Example 1, except using a hydrophobic composition comprising stearic acid and laureth-6 carboxylic acid at a mole ratio of 5:5.

Example 3

A superabsorbent polymer composition was prepared by the same method as Example 1, except using a hydrophobic composition comprising stearic acid and laureth-6 carboxylic acid at a mole ratio of 3:7.

Example 4

A superabsorbent polymer composition was prepared by the same method as Example 1, except that a hydrophobic composition comprising myristic acid (manufactured by Sigma Aldrich) represented by the following Chemical Formula 1-2 instead of stearic acid represented by the Chemical Formula 1-1 in Example 1 was used.

[Chemical Formula 1-2]

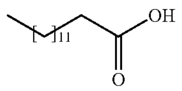

Example 5

A superabsorbent polymer composition was prepared by the same method as Example 1, except that a hydrophobic composition comprising myristic acid represented by the Chemical Formula 1-2 and laureth-11 carboxylic acid (manufactured by KAO) represented by the following Chemical Formula 2-2 was used instead of the hydrophobic composition comprising stearic acid represented by the Chemical Formula 1-1 and laureth-6 carboxylic acid represented by the Chemical Formula 2-1 in Example 1.

[Chemical Formula 2-2]

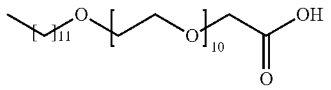

Example 6

A superabsorbent polymer composition was prepared by the same method as Example 1, except that a hydrophobic composition comprising palmitic acid (manufactured by Sigma Aldrich) represented by the following Chemical Formula 1-3 instead of stearic acid represented by the Chemical Formula 1-1 in Example 1 was used.

[Chemical Formula 1-3]

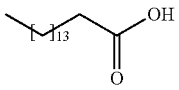

Example 7

A superabsorbent polymer composition was prepared by the same method as Example 1, except that a hydrophobic composition comprising palmitic acid represented by the Chemical Formula 1-3 and laureth-11 carboxylic acid represented by the Chemical Formula 2-2 was used instead of the hydrophobic composition comprising stearic acid represented by the Chemical Formula 1-1 and laureth-6 carboxylic acid represented by the Chemical Formula 2-1 in Example 1.

Comparative Example 1

A superabsorbent polymer composition was prepared by the same method as Example 1, except that a hydrophobic composition was not used.

Comparative Example 2

A superabsorbent polymer composition was prepared by the same method as Example 1, except that a hydrophobic composition comprising only stearic acid in Example 1 was used.

Comparative Example 3

A superabsorbent polymer composition was prepared by the same method as Example 1, except that a hydrophobic composition comprising only laureth-6 carboxylic acid in Example 1 was used.

Comparative Example 4

A superabsorbent polymer composition was prepared by the same method as Example 1, except that a hydrophobic composition comprising a compound represented by the following Chemical Formula A instead of stearic acid in Example 1 was used.

[Chemical Formula A]

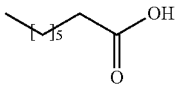

Comparative Example 5

A superabsorbent polymer composition was prepared by the same method as Example 1, except that a hydrophobic composition comprising a compound represented by the following Chemical Formula B instead of laureth-6 carboxylic acid in Example 1 was used.

[Chemical Formula B]

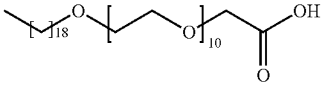

Experimental Example

For the superabsorbent polymer compositions prepared in Examples and Comparative Examples, centrifuge retention capacity (CRC), absorbency under pressure (AUP), wetting time and anti-caking (A/C) efficiency were respectively measured, and the results were shown in the following Table 1.

(1) Centrifuge Retention Capacity (CRC)

Centrifuge retention capacity (CRC) by absorption rate under no load was measured according to European Disposables and Nonwovens Association (EDANA) Standard EDANA WSP 241.3.

Specifically, from each polymer composition obtained in Examples and Comparative Examples, polymer sieved with sieve of #30-50 was obtained. $W_0$ (g, about 0.2 g) of the superabsorbent polymer was uniformly put in an envelope made of non-woven fabric and sealed, and then, soaked in a saline solution (0.9 wt % sodium chloride aqueous solution) at room temperature. After 30 minutes, the envelope was drained at 250 G for 3 minutes using a centrifuge, and then, the weight $W_2$ (g) of the envelope was measured. And, the same operation was conducted without using superabsorbent polymer, and then, the weight $W_1$ (g) at that time was measured.

Using the obtained weights, CRC (g/g) was calculated according to the following Mathematical Formula 1.

$$CRC\ (g/g)=\{[W_2\ (g)-W_1\ (g)]/W_0\ (g)\}-1 \quad \text{[Mathematical Formula 1]}$$

(2) Absorbency Under Pressure (AUP)

For each superabsorbent polymer composition of Examples and Comparative Examples, absorbency under pressure (AUP) of 0.3 psi was measured according to EDANA method WSP 242.3.

First, when measuring absorbency under pressure, the sieved polymer used for the measurement of CRC was used.

Specifically, on the bottom of a plastic cylinder having an inner diameter of 25 mm, a 400 mesh wire netting made of stainless was installed. Under room temperature and 50% humidity conditions, $W_0$ (g) (0.16 g) of each superabsorbent polymer was uniformly sprayed on the wire netting, and a piston having an outer diameter slightly smaller than 25 mm and capable of further giving 0.3 psi load was installed thereon so that there was no gap with the inner wall of the cylinder and the up and down movement was not hindered. At this time, the weight $W_3$ (g) of the device was measured.

Inside a petri dish having a diameter of 150 mm, a glass filter having a diameter of 90 mm and a thickness of 5 mm was laid, and a saline solution consisting of 0.9 wt % sodium chloride was put to the same level with the upper side of the glass filter. One piece of a filter paper having a diameter of 90 mm was laid thereon. On the glass filter, the measuring device was laid, and the liquid was absorbed under pressure for 1 hour. After 1 hour, the measuring device was lifted, and the weight $W_4$ (g) was measured.

Using each obtained weight, AUP (g/g) was calculated according to the following Mathematical Formula 2.

$$AUP\ (g/g)=[W_4\ (g)-W_3\ (g)]/W_0\ (g) \quad \text{[Mathematical Formula 2]}$$

(3) Wetting Time

Wetting time of each superabsorbent polymer of Examples and Comparative Examples was measured at the unit of second, according to the method described in published International Patent Application No. 1987-003208 for measurement of vortex time.

Specifically, while putting 2 g of the superabsorbent polymer composition was put in 50 mL of a saline solution of 23° C. to 24° C., and stirring at 600 rpm with a magnetic bar (diameter 8 mm, length 30 mm), a total time for which a non-wetted superabsorbent polymer composition is observed at the top of liquid was observed. It is evaluated that as the time is longer, a wetting time is not good.

(4) Anti-Caking (A/C) Efficiency 2 g ($W_5$) of each superabsorbent polymer composition prepared in Examples and Comparative Examples was uniformly applied on a flask dish having a diameter of 10 cm, and maintained in a constant temperature and humidity chamber of temperature of 40±3° C. and humidity of 80±3% for 10 minutes, and then, the flask dish was turned upside down on a filter paper and lightly tapped 3 times, and then, the amount ($W_6$) of the superabsorbent polymer composition falling from the flask dish was measured.

Using the measured weights, anti-caking was calculated according to the following Mathematical Formula 3, and the higher the value, more excellent the anti-caking.

$$A/C\ (\%)=W_6/W_5\times 100 \quad \text{[Mathematical Formula 3]}$$

in the Mathematical Formula 3, $W_5$ is the weight (g) of the superabsorbent polymer composition applied on a flask dish having a diameter of 10 cm, and $W_6$ is the weight (g) of the superabsorbent polymer composition falling from a flask dish, after uniformly applying the superabsorbent polymer composition on a flask dish having a diameter of 10 cm, maintaining it in a constant temperature and humidity chamber of temperature of 40±3° C. and humidity of 80±3% for 10 minutes, and then, turning the flask dish upside down on a filter paper and lightly tapping 3 times.

TABLE 1

| | First hydrophobic material | Second hydrophobic material | Mole ratio between hydrophobic materials | SAP properties CRC (g/g) | AUP (g/g) | Wetting time (sec) | A/C efficiency (%) |
|---|---|---|---|---|---|---|---|
| Example 1 | 1-1 | 2-1 | 7:3 | 34.9 | 23.7 | 5 | 61 |
| Example 2 | 1-1 | 2-1 | 5:5 | 35.8 | 24.4 | 3 | 58 |
| Example 3 | 1-1 | 2-1 | 3:7 | 34.9 | 24.1 | 2 | 51 |
| Example 4 | 1-2 | 2-1 | 7:3 | 36.3 | 23.2 | 4 | 55 |
| Example 5 | 1-2 | 2-2 | 7:3 | 35.9 | 23.6 | 3 | 50 |
| Example 6 | 1-3 | 2-1 | 7:3 | 36.1 | 23.3 | 4 | 57 |
| Example 7 | 1-3 | 2-2 | 7:3 | 35.7 | 24.0 | 3 | 53 |
| Comparative Example 1 | — | — | — | 36.9 | 25.0 | 1 | 0 |
| Comparative Example 2 | 1-1 | — | 10:0 | 35.4 | 22.4 | 20 | 76 |
| Comparative Example 3 | | 2-1 | 0:10 | 34.6 | 25.8 | 1 | 11 |
| Comparative Example 4 | A | 2-1 | 7:3 | 35.6 | 22.2 | 3 | 16 |
| Comparative Example 5 | 1-1 | B | 7:3 | 35.1 | 25.1 | 1 | 5 |

Referring to Table 1, the superabsorbent polymer compositions of Examples wherein both the first hydrophobic material and the second hydrophobic material were introduced when milling hydrogel polymer, unlike the superabsorbent polymer compositions of Comparative Examples wherein such hydrophobic materials were not used, or only one kind of hydrophobic material was used, or one of two kinds of hydrophobic materials did not correspond to the hydrophobic material of the present disclosure, exhibit wetting time of 15 seconds or less and anti-caking (A/C) efficiency of 20% or more.

Thus, it can be confirmed that when milling hydrogel polymer in the presence of two kinds of hydrophobic materials having different hydrophobic properties, a superabsorbent polymer composition with improved anti-caking without deterioration of absorption performance can be prepared.

The invention claimed is:

1. A superabsorbent polymer composition comprising superabsorbent polymer particles comprising a cross-linked polymer of water soluble ethylenically unsaturated monomers having acid groups, of which at least a part are neutralized;

a first hydrophobic material; and a second hydrophobic material, wherein the first hydrophobic material comprises stearic acid, myristic acid, palmitic acid, or alkali metal salts thereof, the second hydrophobic material comprises laureth-6 carboxylic acid, laureth-11 carboxylic acid, or alkali metal salts thereof, the first hydrophobic material and the second hydrophobic material are included at a mole ratio of 3:7 to 7:3, and a total weight of the first hydrophobic material and the second hydrophobic material is 0.2 to 0.5 part by weight, based on 100 parts by weight of the superabsorbent polymer particles, wherein the superabsorbent polymer composition has an anticaking (A/C) efficiency calculated by Mathematical Formula 3 of 50% to 65%, and a wetting time of 1 to 5 seconds, the wetting time being defined as a total time for which a non-wetted superabsorbent polymer composition is observed at a top of a liquid, while putting 2 g of the superabsorbent polymer composition in 50 mL of a saline solution at 23° C. to 24° C., and stirring at 600 rpm with a magnetic bar of diameter 8 mm and length 30 mm):

$$A/C\ (\%)=W_6/W_5\times 100 \quad \text{[Mathematical Formula 3]}$$

wherein, $W_5$ is a weight (g) of the superabsorbent polymer composition applied on a flask dish having a diameter of 10 cm, and $W_6$ is a weight (g) of the superabsorbent polymer composition falling from the flask dish, after uniformly applying the superabsorbent polymer composition on the flask dish having a diameter of 10 cm, maintaining it in a constant temperature and humidity chamber at temperature of 40±3° C. and humidity of 80±3% for 10 minutes, and then, turning the flask dish upside down on a filter paper and lightly tapping 3 times.

2. The superabsorbent polymer composition according to claim 1, wherein at least a part of the first hydrophobic material and the second hydrophobic material exist on surfaces of the superabsorbent polymer particles.

3. The superabsorbent polymer composition according to claim 1, wherein the first hydrophobic material is a solid phase at 25° C., and the second hydrophobic material is a liquid phase at 25° C.

4. The superabsorbent polymer composition according to claim 1, further comprising a surface crosslink layer that is formed by additional crosslinking of the crosslinked polymer by a surface crosslinking agent, on at least a part of surfaces of the superabsorbent polymer particles.

* * * * *